(12) United States Patent
Peltz et al.

(10) Patent No.: US 6,407,465 B1
(45) Date of Patent: Jun. 18, 2002

(54) METHODS AND SYSTEM FOR GENERATING ELECTRICAL POWER FROM A PRESSURIZED FLUID SOURCE

(75) Inventors: David M. Peltz, Melbourne, FL (US); Jerome J. Tiemann, Schenectady, NY (US); Russell S. DeMuth, Berne, NY (US); Robert Steigerwald, Burnt Hills, NY (US); Paul Houpt, Schenectady, NY (US); Roy Malac, Indialantic; Glen Peltonen, Melbourne, both of FL (US)

(73) Assignee: GE Harris Railway Electronics LLC, Melbourne, FL (US)

( * ) Notice: Subject to any disclaimer, the term of this patent is extended or adjusted under 35 U.S.C. 154(b) by 61 days.

(21) Appl. No.: 09/661,660

(22) Filed: Sep. 14, 2000

Related U.S. Application Data

(60) Provisional application No. 06/153,772, filed on Sep. 14, 1999.

(51) Int. Cl.[7] .............................................. F01K 13/00
(52) U.S. Cl. ........................................ 290/43; 60/646
(58) Field of Search ........................ 290/7, 40 A, 40 C, 290/43, 52, 54; 60/646, 648

(56) References Cited

U.S. PATENT DOCUMENTS

| | | | |
|---|---|---|---|
| 6,192,687 B1 | * | 2/2001 | Pinkerton et al. .............. 60/646 |
| 6,282,900 B1 | * | 9/2001 | Bell ............................ 60/648 |
| 6,294,842 B1 | * | 9/2001 | Skowronski ................... 290/7 |

* cited by examiner

*Primary Examiner*—Nicholas Ponomarenko
(74) *Attorney, Agent, or Firm*—Carl Rowold; Armstrong Teasdale LLC

(57) ABSTRACT

A pressurized fluid system provides electrical power to a load and includes a fluid motor, a generator, an energy storage device and a controller. The system supplies fluid to the fluid motor, which provides a generator with power producing a voltage used to supply power to a load and provide energy to the energy storage device. The controller selects which of various sources within the system provides fluid to the fluid motor based on the operating mode of the system. When fluid supplied to the fluid motor is discontinued, the energy storage device discharges providing power to the load.

42 Claims, 7 Drawing Sheets

METHODS AND SYSTEM FOR GENERATING ELECTRICAL POWER FROM A PRESSURIZED FLUID SOURCE

CROSS REFERENCE TO RELATED APPLICATIONS

This application claims the benefit of U. S. provisional application No. 60/153,772, filed Sep. 14, 1999.

BACKGROUND OF THE INVENTION

This invention relates generally to generating electrical power and, more particularly, to using a fluid under pressure to generate electrical power where the fluid under pressure is also being used for other purposes and the amount of pressurized fluid available to generate electrical power varies. For example compressed air used in a rail car braking system.

Electrical power is utilized on board a railcar by electronic devices and controls for such functions as electronically controlled pneumatic brakes, sensing for diagnostics, communications (e.g. asset tracking) and GPS functions. Traditional railcars have no electrical power available. It is known to generate voltage, e.g. 230 volts DC (at several kW) in a locomotive and to run the voltage over an entire train length. Since two connectors per car are required to extend the voltage over the entire train, multiple possibilities exist for single point failure, thus making reliability a serious concern. In addition, the entire train must employ all-electronic railcars, i.e. electronic railcars cannot be mixed with traditional railcars that contain no electronics. This non-mixing limitation may lead to problems in new product deployment.

Another known method for providing electrical power is not subject to the above-described limitations. Power is generated on each car by an axle-mounted generator that supplies a load and also charges a battery. Energy from the battery is used to power railcar electronics when the car is at rest or is moving slowly. Battery lifetime, however, is presently limited to approximately five years. There are also reliability concerns associated with a harsh environment for the axle-mounted generator and wires required for distributing power from the generator to a point of use.

It would be desirable to provide a reliable method for generating power on a railcar that is long lived and essentially transparent to a railcar user, i.e. does not require unusual maintenance for the railcar or other train systems. It also would be desirable to provide an energy source for powering an electronically controlled air brake on a pressurized railcar that functions while the car is at rest, in the dark, and with no wind blowing. It also would be desirable to be able to use compressed air already available on a railcar for efficiently generating electrical power with the least impact to pneumatic systems already using the compressed air.

BRIEF SUMMARY OF THE INVENTION

In an exemplary embodiment a system uses pressurized fluid to provide electrical power to a load. The system includes a pressurized fluid supply that provides fluid to a fluid motor, which provides power to a generator for generating electrical power supplied to a load and an energy storage device. A controller selects which of various sources within the system provides fluid to the fluid motor based on the operating mode of the system. When fluid supplied to the fluid motor is discontinued, the energy storage device discharges providing power to the load.

During operation, pressurized fluid runs a fluid motor that drives a high efficiency electrical generator to produce raw power. A control circuit adjusts the generator load such that as much power as possible is drawn from the generator given the pressure available. Energy in excess of that needed by the load is stored electrically in an energy storage device, such as an ultracapacitor. Once the energy storage device is fully charged, an electrically controlled valve shuts off the pressurized fluid supply to the fluid motor. When the pressurized fluid supply is turned off, the energy storage device supplies power to the load. Thus, a large amount of energy for a given fluid motor is extracted from the pressurized fluid supply, and the fluid motor does not continuously run which increases the overall elapsed lifetime of the fluid motor.

DETAILED DESCRIPTION OF THE INVENTION

Figure 1:
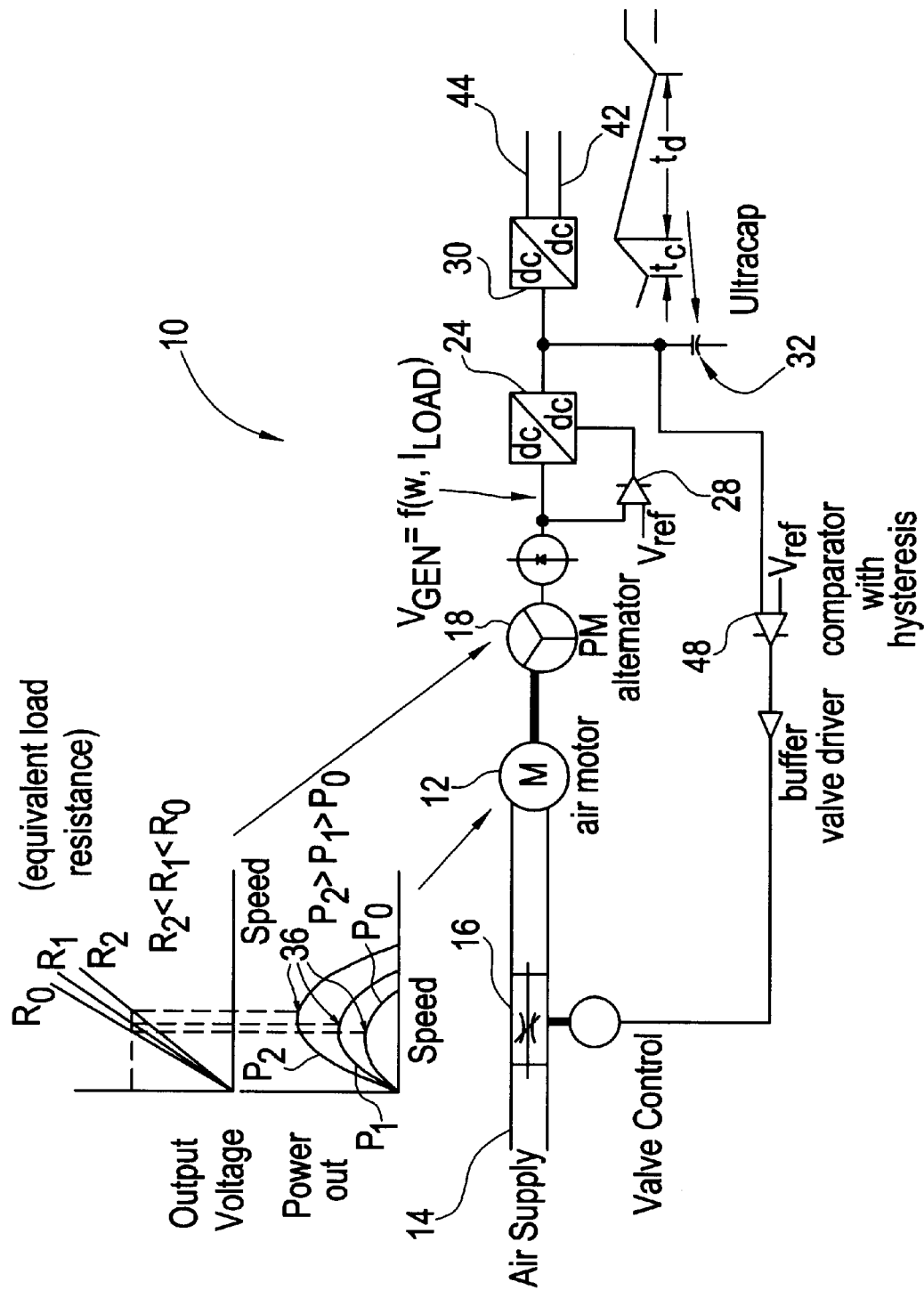
FIG. 1 is a diagram of a power system architecture for generating electrical power from a pressurized fluid source.

FIG. 1 shows a system 10 for generating electrical power from a pressurized fluid source. System 10 includes a fluid motor 12 that receives fluid pressure from a pressurized fluid supply 14 through an input valve 16. Pressurized fluid supply 14 is, for example, a compressed air supply available on a railcar for air braking, or a tractor trailer air braking system or the pneumatic system of an airplane or a watercraft. Fluid motor 12 drives a high-efficiency generator 18, e.g. a permanent magnet rotor, three-phase stator machine. An AC output generated by generator 18 is rectified and filtered to produce a DC output that is supplied to a DC/DC converter 24. As further described below, DC/DC converter 24 is controlled such that an output voltage from generator 18 (i.e. input voltage to DC/DC converter 24) is regulated at a maximum power operating point of fluid motor 12 for a given amount of pressurized fluid. The maximum power operating point is where the fluid motor 12 runs most efficiently. The input voltage to DC/DC converter 24 follows a reference voltage $V_{ref}$ input to an error amplifier 28. A voltage output from DC/DC converter 24 is supplied to a second DC/DC converter 30 and, as further described below, to an energy storage device 32, e.g. an ultracapacitor.

Second DC/DC converter 30 draws power from energy storage device 32 and produces output voltage 42, e.g. a 5-volt output, for driving analog and digital loads, and an output 44, e.g. a 200-volt output, for driving high-voltage loads, for example, a piezo-electrically controlled pneumatic pilot valve.

There is a maximum power operating point of fluid motor 12 that approximates the speed at which generator 18 produces the maximum power per unit of fluid supplied by fluid motor 12. Since the output voltage of generator 18 is proportional to its speed, the output voltage is regulated by regulating the speed of generator 18. Ideally, the speed, and thus the output voltage, of generator 18 is regulated to correlate to the maximum power operating point of fluid motor 12. Regulating generator 18 is accomplished by loading generator 18 with an appropriate load R. Although the maximum power operating point of fluid motor 12 varies somewhat with the variances in the fluid pressure supplied, very little efficiency is sacrificed if the speed, and therefore output voltage, of generator 18 is regulated at a fixed point. In another embodiment where an exact measurement of generator speed is utilized, a zero-voltage crossing of the AC winding (not shown) in generator 18 is sensed and used to determine speed. In yet another embodiment, the specific maximum power characteristics of fluid motor 12, for various operating fluid pressures, are used to regulate the load to keep fluid motor 12 operating at the maximum power operating point.

To extend the operating lifetime of fluid motor 12, energy output by generator 18 that exceeds energy consumption by a load is stored in an energy storage device 32. In one embodiment, energy storage device 32 is an ultracapacitor having a capacity of several farads. As excess energy is stored, voltage across energy storage device 32 rises. When the voltage across energy storage device 32 reaches a predetermined threshold value, e.g. 24 volts, a comparator 48 with hysteresis responds to the threshold voltage by turning off pressurized fluid supply 14 via low-power input valve 16. Valve 16 operates either without using holding power or by using extremely low holding power. In the embodiment shown in FIG. 1, valve 16 is a stepper-motor-driven spool valve. In another embodiment valve 16 is a piezo-controlled valve. In yet another embodiment valve 16 is a solenoid valve.

When pressurized fluid supply 14 is shut off, the load extracts energy from energy storage device 32. Voltage across energy storage device 32 decreases until it reaches a predetermined minimum value, e.g. 12 volts, as determined by comparator 48 with hysteresis. When the voltage across energy storage device 32 reaches the predetermined minimum value, valve 16 is switched so that pressurized fluid is again supplied from supply 14 to fluid motor 12.

Assuming 100 percent electrical conversion efficiency, the duty cycle of fluid motor 12 is a ratio of energy storage device charge time $t_c$ to the discharge time $t_d$, which equals a ratio of the output power supplied to the load $P_o$ by generator 18, to the maximum input power $P_m$ supplied to generator 18 by fluid motor 12 at a given pressure. For example, where the maximum input power $P_m$ is 24 watts and the output power $P_o$ required by the load is 5 watts, a run time for fluid motor 12 compared to total elapsed time (i.e. a duty cycle D) is expressed in accordance with:

$$D = \frac{t_c}{t_c + t_d} = \frac{P_o}{P_o + P_m} = 9.1\%.$$

Thus, e.g. over a ten-year period, a fluid motor, such as motor 12, running with power levels as described above has a run time of approximately 11 months. Therefore, the life of fluid motor 12 is extended using standard low cost construction methods for fluid motor 12 instead of other more costly complicated and involved construction methods.

Figure 2:
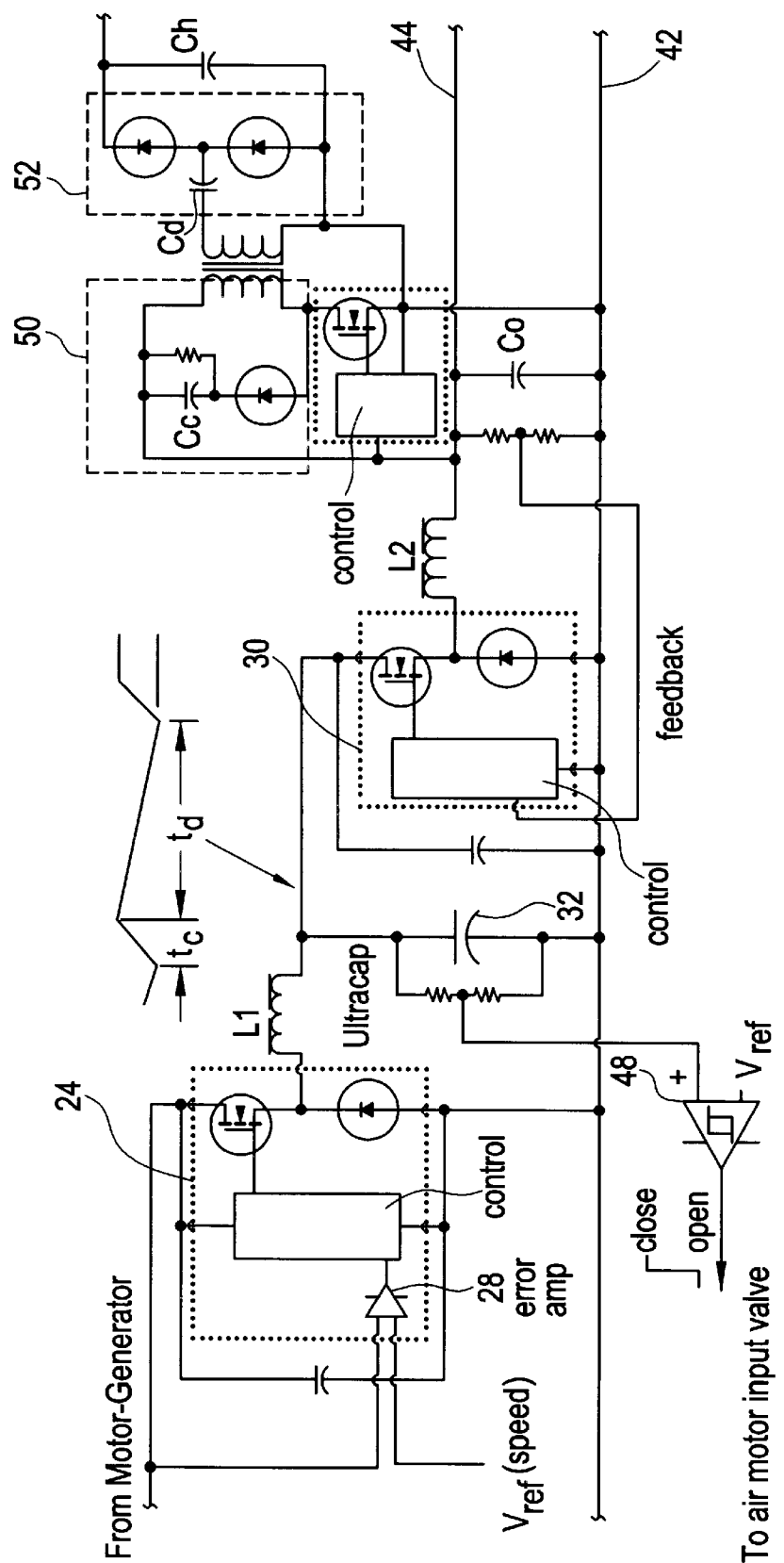
FIG. 2 is a circuit diagram of one embodiment of the control electronics for the system shown in FIG. 1.

FIG. 2 is a circuit diagram of one embodiment of power electronics for system 10 shown in FIG. 1. Components in FIG. 2 identical to components in FIG. 1 are identified in FIG. 2 using the same numerals as used in FIG. 1. Converter 24 draws the correct power from generator 18 as commanded by error amplifier 28 to charge energy storage device, 32 and supply the load until comparator 48 with hysteresis shuts off pressurized fluid supply 14. After pressurized fluid supply 14 is shut off, energy storage device 32 begins to discharge and supply power to the load. To supply output 42, voltage discharged from energy storage device 32 is converted to regulated voltage by converter 30. To generate high voltage 44 (e.g. 200 Vdc) a flyback regulator 50 with a voltage doubler 52 is attached at the output of converter 30. Ideally, flyback regulator 50 runs off of the regulated output 42 and can therefore be optimized at a relatively fixed duty cycle. Additionally, by employing voltage doubler 52 at the secondary side of flyback regulator 50, some energy is transferred to the high voltage side so that less energy is stored in the core, resulting in a small, efficient, and simple high voltage supply.

In one embodiment where the high voltage is powering piezo-controlled valves, and the valves are in a fixed position such that they have negligible holding power, the voltage supply to flyback generator 50 can be terminated once the output voltage reaches the desired value. The supply to flyback generator 50 can be cycled on again at the appropriate time. In this manner, no parasitic power is consumed and no core losses are incurred when the valves are in a fixed position.

Figure 3:
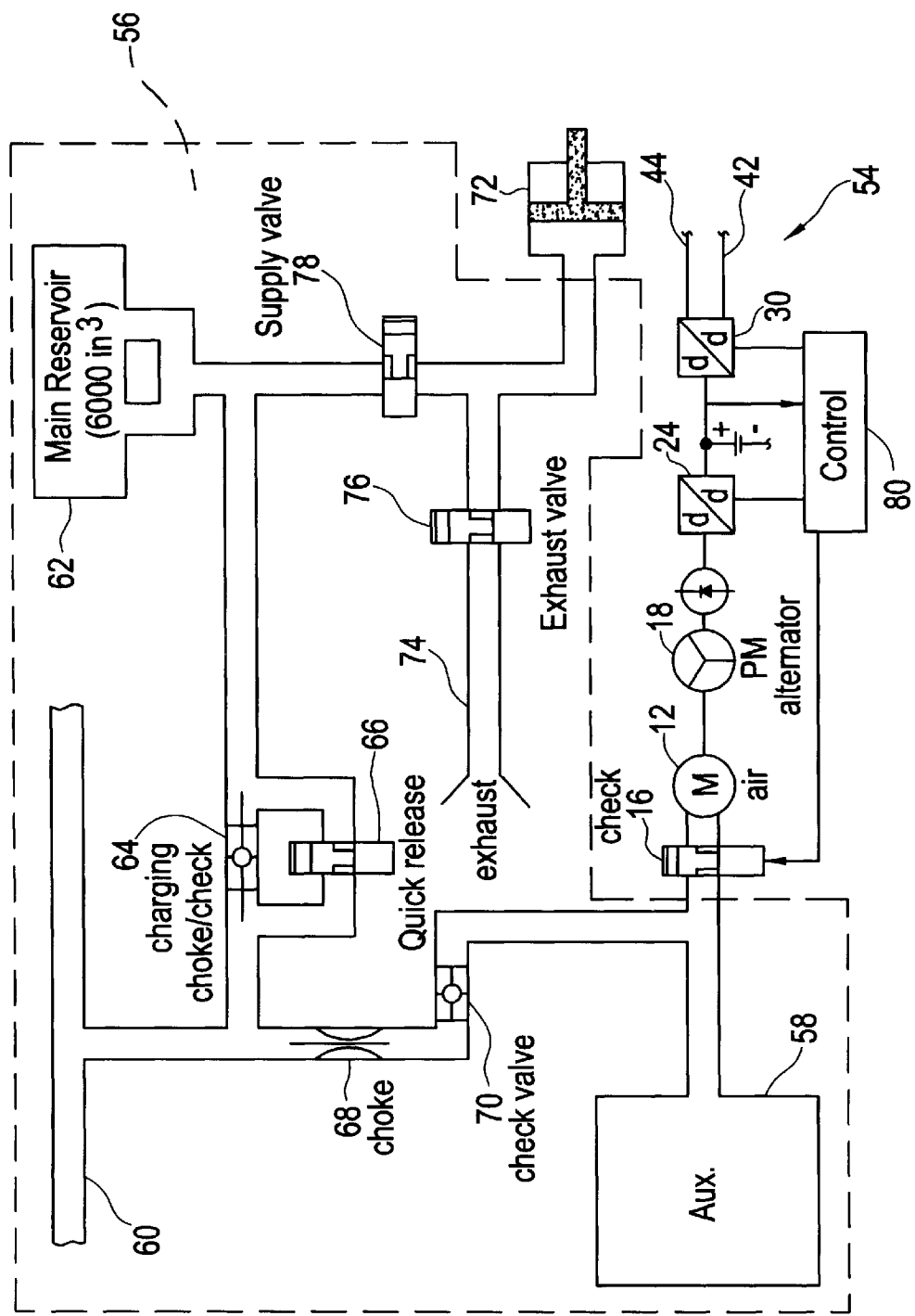
FIG. 3 is a schematic diagram of a system for generating electrical power from pressurized fluid system using an auxiliary reservoir.

FIG. 3 is a schematic diagram of a system 54 for generating electrical power from a pressurized fluid system 56 using an auxiliary reservoir 58. In one embodiment pressurized fluid system 56 is a compressed air braking system used in a rail car. Components in system 54 identical to components of system 10 (shown in FIG. 1) are identified in FIG. 3 using the same reference numerals as used in FIG. 1. Pressurized fluid system 56 includes a pressurized fluid source 60 that supplies pressurized fluid to a main reservoir 62 and to auxiliary reservoir 58. In line between pressurized fluid source 60 and main reservoir 62 is a charging choke and check valve 64 and a quick release valve 66, which control the flow of fluid to main reservoir 62. In line between pressurized fluid source 60 and auxiliary reservoir 58 are a choke 68 and a check valve 70, which control the fluid flow to auxiliary reservoir 58. Main reservoir 62 supplies fluid to a pressurized fluid driven device 72, for example a railcar brake cylinder. Excess fluid supplied to device 72 is released as exhaust 74 through an exhaust valve 76. A supply valve 78 controls the flow of fluid from main reservoir 62 to device 72. Auxiliary reservoir 58 supplies fluid to fluid motor 12 of system 54. Pressurized fluid source 60 supplies fluid to auxiliary reservoir 58 charging it to a maximum level. Auxiliary reservoir 58 in turn supplies pressurized fluid through input valve 16, which is regulated by control 80, to fluid motor 12 of system 54. As fluid from auxiliary reservoir 58 is depleted auxiliary reservoir 58 is recharged with fluid from pressurized fluid source 60.

Figure 4:
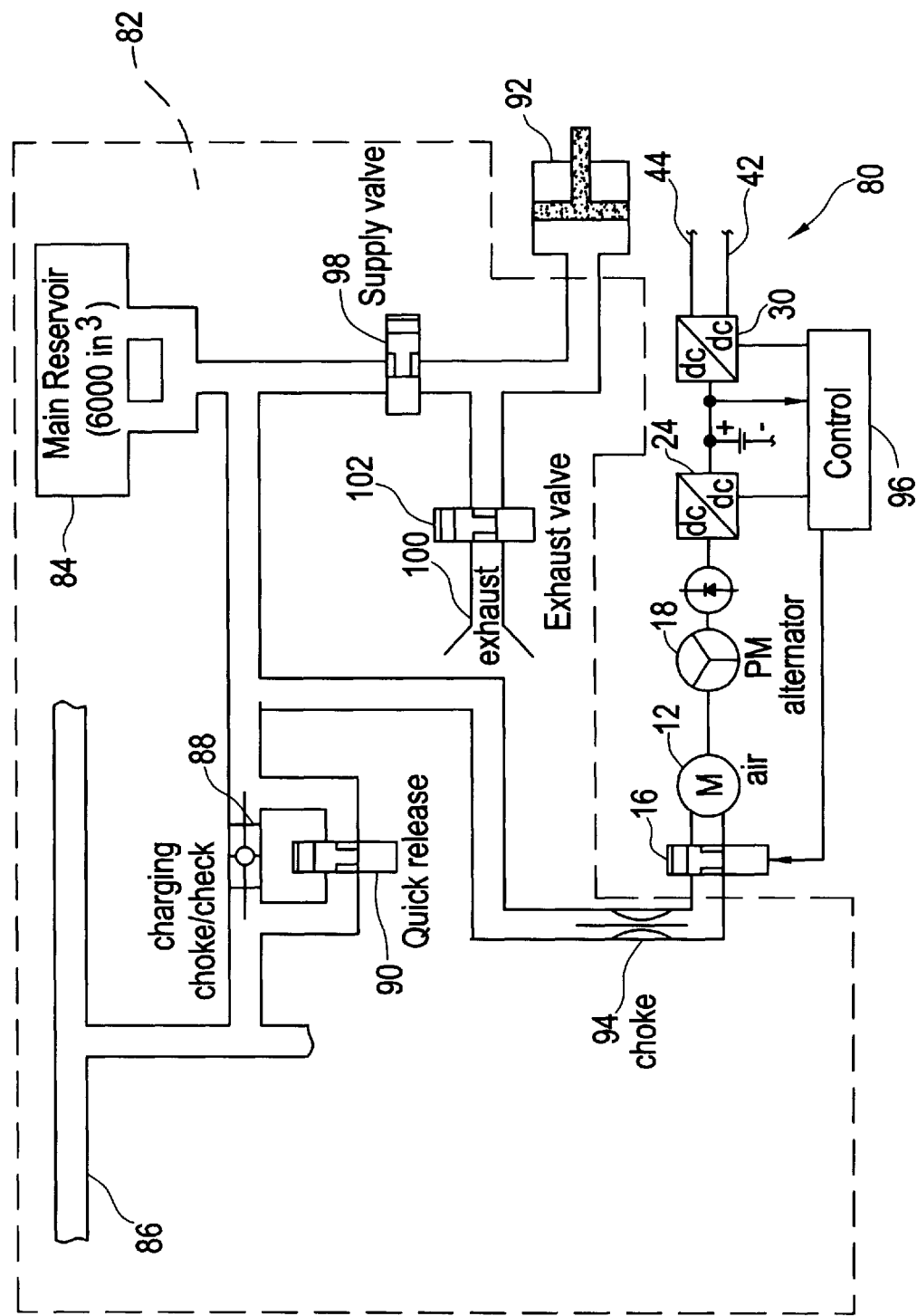
FIG. 4 is a schematic diagram of a system for generating electrical power from a pressurized fluid system using an existing main reservoir.

FIG. 4 is a schematic diagram of a system 80 for generating electrical power from a pressurized fluid system 82 using an existing main reservoir 84. In one embodiment pressurized fluid system 82 is a compressed air braking system used in a rail car. Components in system 80 identical to components of system 10 (shown in FIG. 1) are identified in FIG. 4 using the same reference numerals as used in FIG. 1. Pressurized fluid system 82 includes a pressurized fluid source 86 that supplies pressurized fluid to a main reservoir 84 charging it to a maximum level. In line between pressurized fluid source 86 and main reservoir 84 is a charging choke and check valve 88 and a quick release valve 90, which control fluid flow to main reservoir 84. Main reservoir 84 supplies pressurized fluid to a pressurized fluid driven device 92, for example a railcar brake cylinder, and to fluid motor 12 of system 80. A choke 94 restricts fluid flow to input valve 16, which controls fluid flow to fluid motor 12. Input valve 16 is regulated by control 96. A supply valve 98 controls the fluid flow to device 92. Excess fluid supplied to device 92 is released as exhaust 100 through exhaust valve 102. As fluid from main reservoir 84 is depleted main reservoir 84 is recharged with fluid from pressurized fluid source 86.

Figure 5:
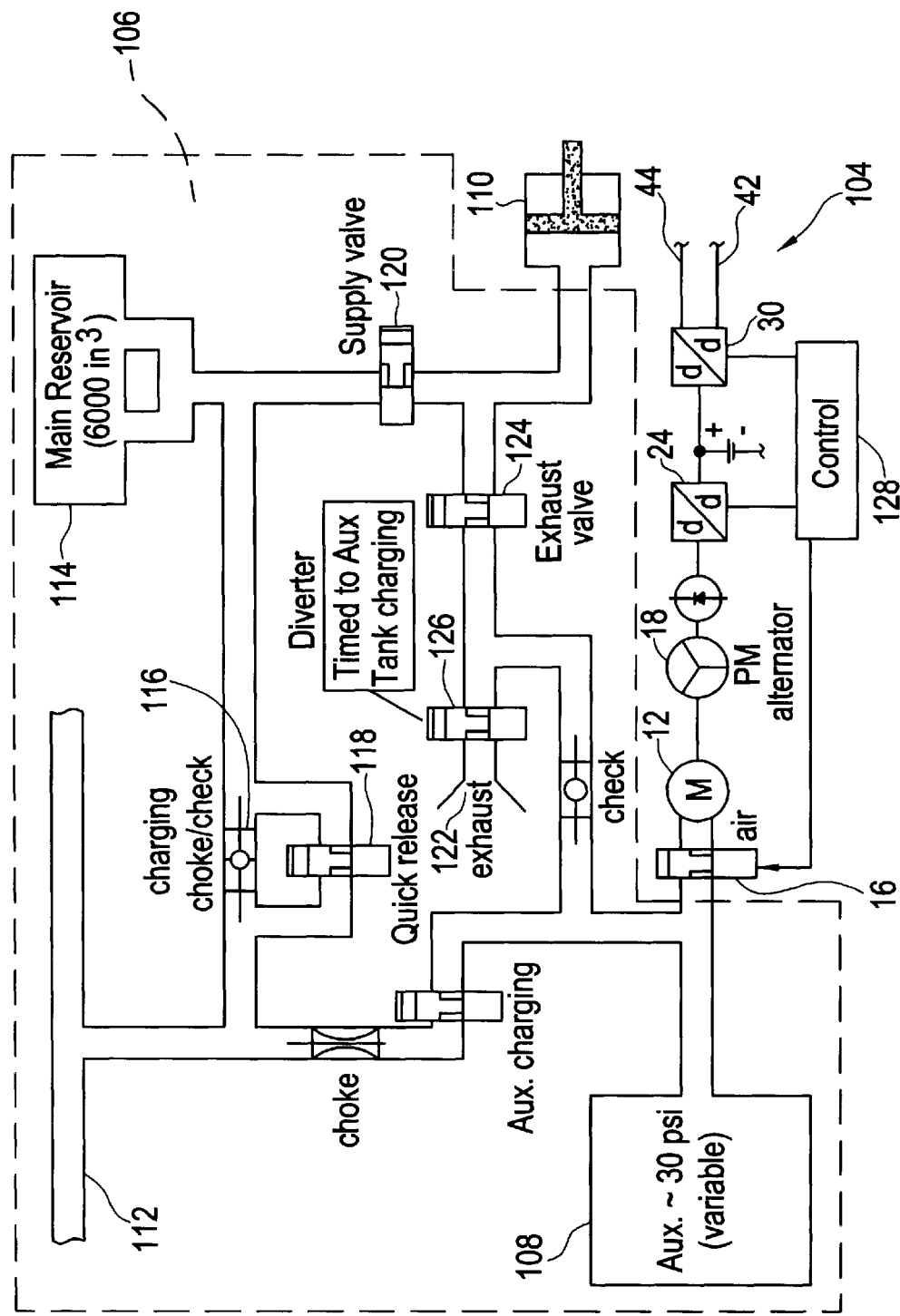
FIG. 5 is a schematic diagram of a system for generating electrical power from a pressurized fluid system using an auxiliary reservoir and excess pressurized fluid released from a pressurized fluid driven device.

FIG. 5 is a schematic diagram of a system 104 for generating electrical power from a pressurized fluid system 106 using an auxiliary reservoir 108 and excess pressurized fluid released from a pressurized fluid driven device 110. In one embodiment pressurized fluid system 106 is a compressed air braking system used in a rail car. Components in system 104 identical to components of system 10 (shown in FIG. 1) are identified in system 104 using the same reference numerals as used in FIG. 1. Pressurized fluid system 106 includes a pressurized fluid source 112 that supplies pressurized fluid to a main reservoir 114. In line between pressurized fluid source 112 and main reservoir 114 is a charging choke and check valve 116 and a quick release valve 118, which control the flow of fluid to main reservoir 114. Main reservoir 114 supplies pressurized fluid through a supply valve 120 to pressurized fluid driven device 110, for example a railcar brake cylinder. Excess pressurized fluid not used by device 110 is released as exhaust 122. An exhaust valve 124 controls the flow of exhaust 122. A diverter 126 diverts exhaust 122 so that exhaust 122 is used to charge auxiliary reservoir 108, which supplies pressurized fluid, controlled by input valve 16, to fluid motor 12 of system 104. Input valve 16 is regulated by control 128. If device 110 does not use pressurized fluid for an extended period of time and exhaust 122 is insufficient to maintain an adequate charge of auxiliary reservoir 108, pressurized fluid source 112 supplies fluid to auxiliary reservoir 108. As fluid from auxiliary reservoir 108 is depleted auxiliary reservoir 108 is recharged with fluid from exhaust 122, or if exhaust 122 is insufficient, with fluid from pressurized fluid source 112.

Figure 6:
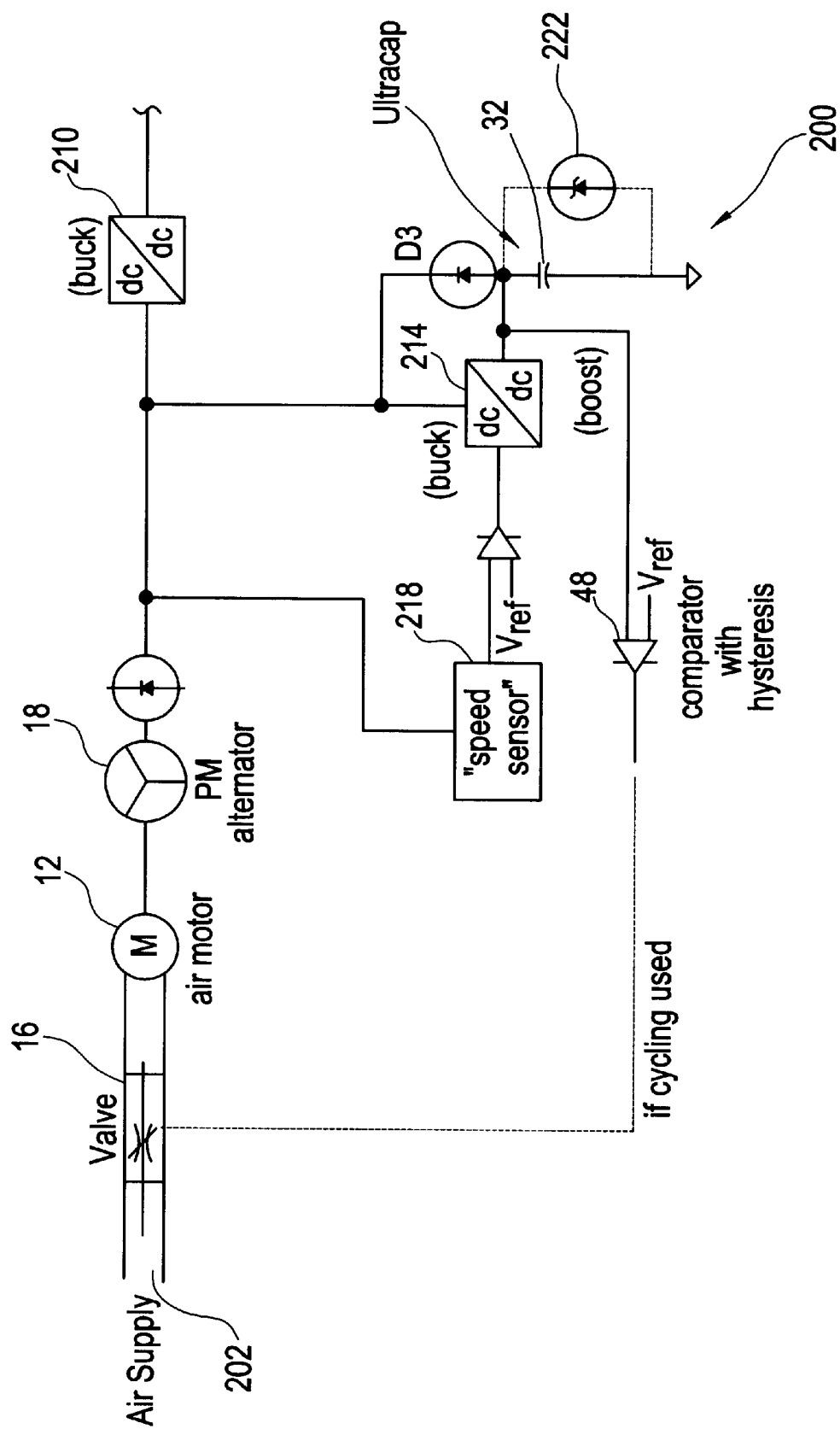
FIG. 6 illustrates an alternate embodiment of a power system architecture for generating electrical power from a pressurized fluid source having a bi-directional power converter.

FIG. 6 shows a system 200 for generating electrical power from a pressurized fluid source. Components in system 200 identical to components of system 10 (shown in FIG. 1) are identified in system 200 using the same reference numerals as used in FIG. 1. System 200 is configured to provide energy to the load immediately upon startup without waiting for energy storage device 32 to fully charge, and to allow most of the stored energy to be extracted from energy storage device 32 before energy storage device 32 is recharged. A normally closed input valve 16 controls a pressurized fluid supply 202 that supplies fluid to fluid motor 12, which in turn drives electrical generator 18. The AC output of generator 18 is rectified to produce a DC bus, e.g. a +14 volt DC bus, supplying voltage to a DC/DC step down buck converter 210 and a bi-directional DC/DC converter 214. Converter 210 converts the voltage to a final utilization voltage, e.g. +5 Vdc, which is supplied to a load. Thus, energy can be applied to the load immediately at start up without waiting for energy storage device 32 to charge.

Simultaneous with converter 210 supplying voltage to the load, bi-directional converter 214 charges an energy storage device 32. In one embodiment, energy storage device is an ultracapacitor. Converter 214 operates as a step down buck converter to charge energy storage device 32, and as a step up boost converter during discharge of energy storage device 32. The amount of charging power is set to regulate the DC bus to a constant value, e.g. near +14 volts, which is assumed to be near the peak power of generator 18. To control the DC bus, and thereby the speed of generator 18, bus voltage is sensed by a voltage divider 218 and compared to a reference voltage, $V_{ref}$. In addition, power charging energy storage device 32 is automatically controlled such that the total power output of generator 18 is approximately the value that causes fluid motor 12 to run near its maximum power operating point.

Energy storage device 32 is charged until it reaches a predetermined maximum voltage. Once energy storage device 32 is charged fluid valve 16 is turned off to interrupt the flow of fluid to fluid motor 12. Power is then supplied to the load by operating converter 214 as a boost regulator to extract power from energy storage device 32 by stepping up the voltage to the bus level, e.g. +14 volts. Converter 210 then steps the voltage down to the load level, e.g. +5 volts. It should be noted that boost operation of converter 214 is not necessary until energy storage device 32 discharges below the output voltage, e.g. +5 Vdc. Therefore, until the voltage level of energy storage device 32 falls below the level needed by the load, voltage is discharged directly by an output switching regulator (not shown) and converter 214 is not used. By utilizing converter 214 as a boost regulator, energy storage device 32 can be discharged to near zero, allowing most of the stored energy to be extracted thereby allowing for minimized size of energy storage device 32.

In an alternate embodiment input valve 16 is not turned off to interrupt fluid flow to fluid motor 12 when energy storage device 32 is fully charged. Instead, when energy storage device 32 is charged to the upper level, clamping circuit 222 limits the voltage and dissipates the extra power being delivered by generator 18. Therefore, the fluid supply to fluid motor 12 is not interrupted and voltage is continuously supplied to energy storage device 32. In one embodiment clamping circuit 222 is a Zener diode.

Figure 7:
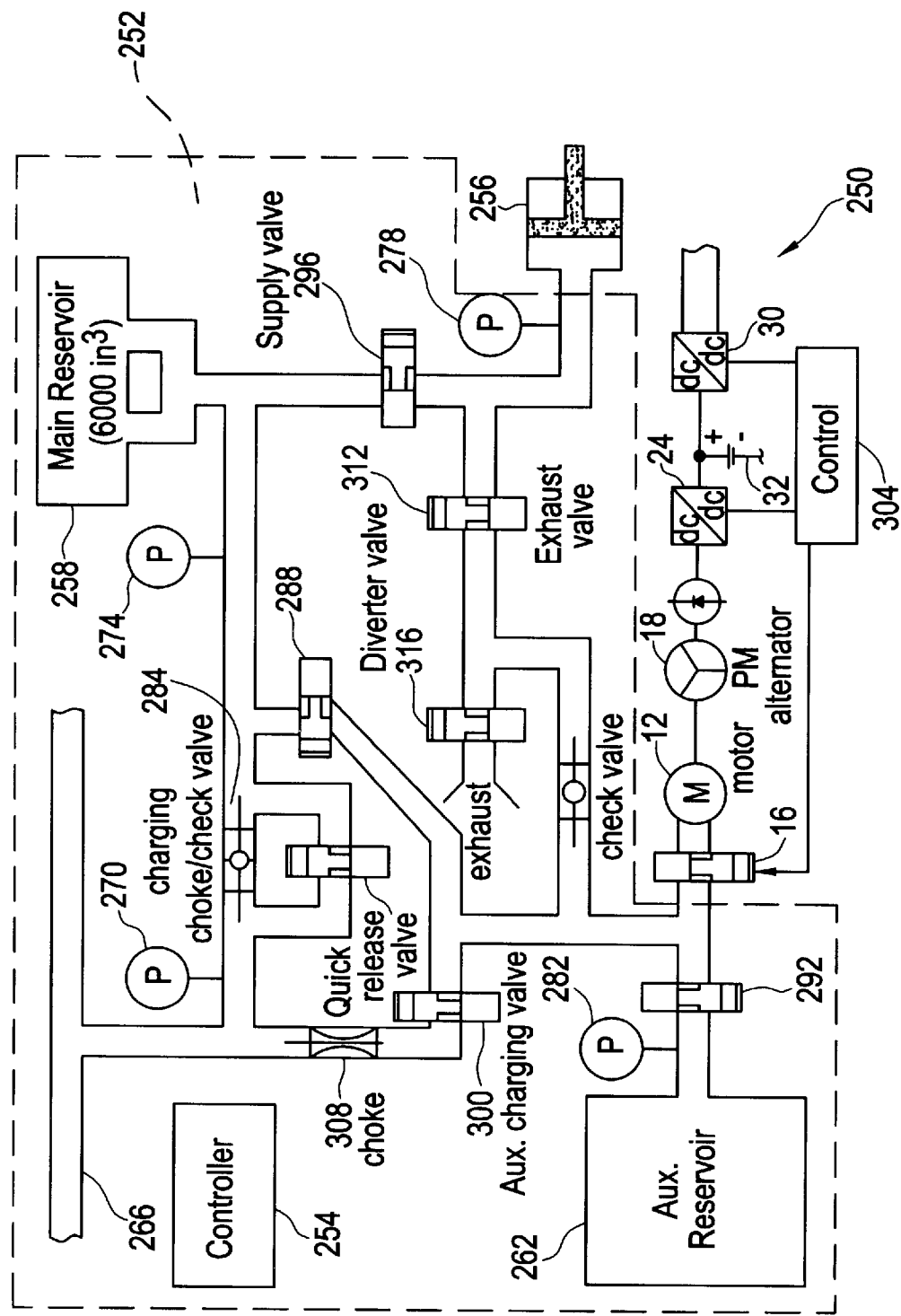
FIG. 7 is a schematic diagram of a system for generating electrical power using pressurized fluid supplied from a pressurized fluid system that includes a controller for selecting the source of pressurized fluid.

FIG. 7 is a schematic diagram of a system 250 for generating electrical power using pressurized fluid supplied from a pressurized fluid system 252 that includes a controller 254 for selecting the source of pressurized fluid. Components in system 250 identical to components of system 10 (shown in FIG. 1) are identified in system 250 using the same reference numerals as used in FIG. 1.

In addition to supplying a source of pressurized fluid for generating electrical power, pressurized fluid system 252 supplies pressurized fluid to a pressurized fluid driven system 256. System 252 includes, as sources of pressurized fluid, a main reservoir 258, an auxiliary reservoir 262, and a fluid transport pipe 266. Additionally, system 252 includes a fluid transport pipe sensor 270, a main reservoir sensor 274, an exhaust sensor 278, and a auxiliary reservoir sensor 282 that monitor the pressures of transport pipe 266, main reservoir 258, system 256, and auxiliary reservoir 262 respectively. Controller 254 selects the most appropriate source of pressurized fluid based on the operating mode of system 252 and the pressures sensed by sensors 270, 274, 278, and 282. In one embodiment controller 254 is an application running on a microprocessor. In another embodiment controller 254 is a device capable of monitoring sensors 270, 274, 278, and 282, and controlling the flow of pressurized fluid in system 252.

During operation of system 252 the pressures in main reservoir 258, transport pipe 266, auxiliary reservoir 262 and system 256 vary with respect to one another in different operating modes of system 252. Controller 254 recognizes the mode and uses fluid from the pressurized fluid source that is less important for the given operating mode to supply pressurized fluid for generating electrical power. Thus, controller 254 controls the fluid communications for a given mode to provide the most available pressure for electrical power generation without adversely impacting the operation of system 252.

In one embodiment system 250 is used on a rail car, system 252 is a compressed air braking system used by the rail car, fluid transport pipe 266 is a brake pipe, transport pipe sensor 270 is a brake pipe sensor, and pressurized fluid driven system 256 is a brake cylinder. In the context of a rail car, system 250 uses controller 254 to select the most appropriate source of air pressure based on the operating mode of system 252.

For a railcar electronically controlled brake system, at least three general volumes will have air pressures that are useful for generating electrical power. The three general volumes are brake pipe 266, main reservoir 258, and brake cylinder 256. In one embodiment an auxiliary reservoir 262 is provided as a fourth volume. Sensors 270, 274, 278, and 282 monitor the pressures in the four volumes and provide the pressures to controller 254. Through the course of brake operations these four pressures vary with respect to one another with varying levels of importance for proper brake operation in a given operating mode. Controller recognizes the mode and uses air from the volume that is less important for the given mode to supply pneumatic pressure for generating electrical power.

In one embodiment the operating mode is an initial charging mode. In this mode at least one locomotive (not shown) is supplying air to brake pipe 266. On a rail car, the air pressures in brake pipe 266 and main reservoir 258 are rising as air from brake pipe 266 passes through a charging choke/check valve 284 to fill main reservoir 258. At this time in the initial charging mode, the pressure in brake cylinder 256 is zero and cannot be used as a source of compressed air for generating electrical power. During the initial charging mode, the pressure in main reservoir 258 is not important to brake operation and is used for electrical power generation with little restriction. Controller 254 opens a main reservoir valve 288 so that air from main reservoir 258 is available to input valve 16. If input valve 16 is closed because the load is operating from the energy stored in electrical storage device 32, then controller 254 opens an auxiliary reservoir valve 292 to fill auxiliary reservoir 262. The air in auxiliary reservoir 262 is available to be used during other operating modes when the pressure in other volumes is important for brake operations and therefore restricted.

In another embodiment a train service brake application mode is initiated when the pressure in brake pipe 266 is reduced due to the application of brake cylinder 256. System 252 uses air from main reservoir 258 to fill brake cylinder 256 by operating a supply valve 296. The pressure in main reservoir 258 becomes more important for brake application and is no longer recharged with air from brake pipe 266. The pressure in main reservoir 258 is retained for a possible further brake application, therefore controller 254 does not open main reservoir valve 288 to provide air for electrical power generation. Instead, controller 254 opens a brake pipe valve 300 to provide air to input valve 16. Input valve 16 controls air flow provided to air motor 12, and control 304 regulates input valve 16. A choke 308 prevents excessive amounts of air from being drawn from the brake pipe 266, which would cause an unintended pressure reduction.

In yet another embodiment the operating mode is an emergency brake application mode. In an emergency brake application mode, the pressure in brake pipe 266 drops to zero and cannot be used to supply air for electrical power generation. Controller 254 recognizes this mode and keeps brake pipe valve 300 closed while opening auxiliary reservoir valve 292 to provide air for electrical power generation.

In still another embodiment the operating mode is a release from a brake application mode. In this mode pressure in brake pipe 266 rises. Controller 254 operates an exhaust valve 312 to release the pressure in brake cylinder 256. Controller 254 determines the pressure in the auxiliary reservoir 255 and if this pressure is less than the air pressure in brake cylinder 256, controller 254 opens auxiliary reservoir valve 292 to provide air to auxiliary reservoir 262. When the pressure in auxiliary reservoir 262 equals the pressure in exhausting brake cylinder 256, controller 254 closes auxiliary reservoir valve 292. Therefore, compressed air from brake cylinder 256 is supplied to air motor 12 through input valve 16. If input valve 16 is closed controller 254 opens diverter valve 316 to vent the exhaust of brake cylinder 256.

As shown above, the present invention provides a system that uses pressurized fluid to supply power to a generator, which generates power supplied to a load and to an energy storage device. Excess energy not used by the load is stored in an energy storage device, which provides power to the load when the pressurized fluid supply is discontinued.

While the invention has been described in terms of various specific embodiments, those skilled in the art will recognize that the invention can be practiced with modification within the spirit and scope of the claims.

What is claimed is:

1. A method for providing electrical power to a load using a pressurized fluid system, the system including an fluid motor connected to a generator electrically connected to an energy storage device, said method comprising the steps of:

generating a voltage with the generator;

supplying the voltage to a first converter;

providing at least a portion of the output of the first converter to a second converter;

storing at least a portion of the output of the first converter in the energy storage device; and supplying the output of the second converter to the load at a constant voltage.

2. A method in accordance with claim 1 wherein said step of generating a voltage with the generator further comprises the steps of:

supplying the fluid motor with pressurized fluid; and using the fluid motor to provide power to the generator.

3. A method in accordance with claim 1 further comprising the steps of:

regulating the voltage generated with the generator; and regulating a speed of the generator to correspond to a power operating point of the fluid motor.

4. A method in accordance with claim 1 wherein said step of supplying the voltage to a first converter further comprising the steps of:

rectifying the voltage generated by the generator; and supplying the rectified voltage to a first converter.

5. A method in accordance with claim 1 wherein said step of storing at least a portion of the output of the first converter in the energy storage device further comprises the steps of:

generating voltage with the generator when the fluid motor is supplied with pressurized fluid;

storing, in the energy storage device, generated electrical energy that exceeds load consumption; and discontinuing the supply of pressurized fluid when the energy stored in the energy storage device reaches a predetermined amount.

6. A method in accordance with claim 1 further comprising the steps of:

extracting stored energy from the energy storage device;

supplying the extracted stored energy to the second converter until the energy storage device drops to a predetermined energy level; and supplying pressurized fluid when the energy stored in the energy storage device drops to a predetermined energy level.

7. A method in accordance with claim 1 wherein the energy storage device is an ultracapacitor, said step of storing a least a portion of the output of the first converter in the energy storage device further comprises the step of storing generated electrical energy that exceeds load consumption in the ultracapacitor.

8. A method for providing electrical power to a load using a pressurized fluid system, the system including an fluid motor connected to a generator electrically connected to an energy storage device, said method comprising the steps of:

generating a voltage with the generator;

supplying at least a portion of the voltage to a first converter;

supplying at least a portion of the voltage to a second converter;

storing a first output of the first converter in the energy storage device;

supplying a second output of the first converter to the second converter; and supplying the output of the second converter to the load at a constant voltage.

9. A method in accordance with claim 8 wherein said step of generating a voltage with the generator further comprises the steps of:

supplying the fluid motor with pressurized fluid; and using the fluid motor to provide power to the generator.

10. A method in accordance with claim 8 further comprising the steps of:

regulating the voltage generated with the generator; and regulating a speed of the generator to correspond to a power operating point of the fluid motor.

11. A method in accordance with claim 8 wherein said step of supplying at least a portion of the voltage to a first converter further comprising the steps of:

rectifying the voltage generated by the generator; and supplying the rectified voltage to a first converter.

12. A method in accordance with claim 8 wherein said step of storing a first output of the first converter in the energy storage device comprises the steps of:

generating voltage with the generator when the fluid motor is supplied with pressurized fluid;

storing, in the energy storage device, generated electrical energy that exceeds load consumption; and discontinuing the supply of pressurized fluid when the energy stored in the energy storage device reaches a predetermined amount.

13. A method in accordance with claim 8 further comprising the steps of:

extracting stored energy from the electrical storage device;

supplying the extracted stored energy to the first converter until the energy storage device drops to a predetermined level;

supplying the extracted stored energy output from the first converter to the second converter; and supplying pressurized fluid when the energy stored in the energy storage device drops to a predetermined energy level.

14. A method in accordance with claim 8 wherein the energy storage device is an ultracapacitor, said step of storing a first output of the first converter in the energy storage device further comprises the step of storing generated electrical energy that exceeds load consumption in the ultracapacitor.

15. A system for using pressurized fluid to provide electrical power to a load, said system comprising:

a generator configured to generate a voltage;

a first converter configured to receive said voltage generated by said generator;

a second converter configured to receive at least a portion of an output of said first converter; and an energy storage device configured to store at least a portion of the output of said first converter.

16. A system in accordance with claim 15 wherein said energy storage device is an ultracapacitor.

17. A system in accordance with claim 15 wherein said energy storage device further configured to supply a stored voltage to said second converter.

18. A system in accordance with claim 15 wherein said second converter configured to supply an output voltage to a load.

19. A system in accordance with claim 15 further comprising a fluid motor configured to provide power to said generator.

20. A system in accordance with claim 19 configured to supply pressurized fluid to said fluid motor.

21. A system in accordance with claim 19 further configured to discontinue supplying pressurized fluid to said fluid motor when said energy storage device reaches a predetermined amount of stored energy.

22. A system in accordance with claim 19 further configured to continue supplying pressurized fluid to said fluid motor when said energy storage device drops to a predetermined amount of stored energy.

23. A system in accordance with claim 19 further comprising a plurality of pressurized fluid sources, said pressurized fluid sources configured to provide pressurized fluid to said fluid motor.

24. A system in accordance with claim 23 further comprising a controller configured to select at least one of said pressurized fluid sources to provide pressurized fluid to said fluid motor.

25. A system in accordance with claim 24 wherein said controller further configured to control the flow of pressurized fluid to and from said pressurized fluid sources.

26. A system for using pressurized fluid to provide electrical power to a load, said system comprising:

a generator configured to generate a voltage;

a first converter configured to receive at least a portion of said voltage generated by said generator;

an energy storage device configured to store a first output of said first converter, said energy storage device further configured to supply a stored voltage to said first converter; and a second converter configured to receive at least a portion of said voltage generated by said generator, said second converter further configured to receive a second output of said first converter.

27. A system in accordance with claim 26 wherein said energy storage device is an ultracapacitor.

28. A system in accordance with claim 26 wherein said second converter configured to supply an output voltage to a load.

29. A system in accordance with claim 26 further comprising a fluid motor configured to provide power to said generator.

30. A system in accordance with claim 29 configured to supply pressurized fluid to said fluid motor.

31. A system in accordance with claim 29 further configured to discontinue supplying pressurized fluid to said fluid motor when said energy storage device reaches a predetermined amount of stored energy.

32. A system in accordance with claim 29 further configured to continue supplying pressurized fluid to said fluid motor when said energy storage device drops to a predetermined amount of stored energy.

33. A system in accordance with claim 29 further comprising a plurality of pressurized fluid sources, said pressurized fluid sources configured to provide pressurized fluid to said fluid motor.

34. A system in accordance with claim 33 further comprising a controller configured to select at least one of said pressurized fluid sources to provide pressurized fluid to said fluid motor.

35. A system in accordance with claim 34 wherein said controller further configured to control the flow of pressurized fluid to and from said pressurized fluid sources.

36. A system for using pressurized fluid to provide electrical power to a load, said system comprising:

a generator configured to generate a voltage;

a fluid motor configured to provide power to said generator;

a plurality of pressurized fluid sources configured to supply pressurized fluid to said fluid motor; and a controller configured to select at least one of said plurality of pressurized fluid sources to provide pressurized fluid to said fluid motor.

37. A system in accordance with claim 36 wherein said controller further configured to control the flow of pressurized fluid to and from said plurality of pressurized fluid sources.

38. A system in accordance with claim 36 further comprising a first converter configured to receive at least a portion of said voltage generated by said generator, and a second converter configured to supply an output voltage to a load.

39. A system in accordance with claim 36 further comprising an energy storage device.

40. A system in accordance with claim 39 further configured to discontinue supplying pressurized fluid to said fluid motor when said energy storage device reaches a predetermined amount of stored energy.

41. A system in accordance with claim 39 further configured to continue supplying pressurized fluid to said fluid motor when said energy storage drops to a predetermined amount of stored energy.

42. A system in accordance with claim 39 wherein said energy storage device is an ultracapacitor.

* * * * *